(12) United States Patent
Sun et al.

(10) Patent No.: US 9,000,352 B2
(45) Date of Patent: Apr. 7, 2015

(54) OPTICAL COUPLING DEVICE HAVING AT LEAST DUAL LENS AND A REFLECTIVE SURFACE

(71) Applicant: Asia Opitical International Ltd., Tortola, B.V.I. (GB)

(72) Inventors: Chia-Tse Sun, Taichung (TW); Bing-Hung Shih, Taichung (TW)

(73) Assignee: Asia Opitical International Ltd., Taichung (TW)

( * ) Notice: Subject to any disclaimer, the term of this patent is extended or adjusted under 35 U.S.C. 154(b) by 273 days.

(21) Appl. No.: 13/734,219

(22) Filed: Jan. 4, 2013

(65) Prior Publication Data

US 2013/0234010 A1   Sep. 12, 2013

(30) Foreign Application Priority Data

Mar. 8, 2012 (TW) .................................. 101107968

(51) Int. Cl.
*H01J 3/14*    (2006.01)
*G01J 1/04*    (2006.01)
*G02B 6/32*    (2006.01)
*G02B 6/42*    (2006.01)

(52) U.S. Cl.
CPC ............. *G01J 1/0425* (2013.01); *G01J 1/0407* (2013.01); *G01J 1/0414* (2013.01); *G02B 6/32* (2013.01); *G02B 6/4214* (2013.01); *G02B 6/425* (2013.01)

(58) Field of Classification Search
USPC ......... 250/216, 227.11, 239, 551; 385/31–35, 385/8–14, 47–49, 88–94
See application file for complete search history.

(56) References Cited

U.S. PATENT DOCUMENTS 6,888,988 B2 *   5/2005   Vancoille et al. ............... 385/47
2004/0179784 A1  9/2004   Vancoille et al.

FOREIGN PATENT DOCUMENTS

| CN | 101868704 A | 10/2010 |
| CN | 102349010 A | 2/2012 |
| TW | 531673 | 11/2000 |
| TW | 201137418 A1 | 11/2011 |

* cited by examiner

*Primary Examiner* — Que T Le
(74) *Attorney, Agent, or Firm* — Apex Juris, PLLC; Tracy M Heims

(57) ABSTRACT

An optical coupling device includes an optical coupling member, at least one photoelectric converter, and at least one optical fiber. The optical coupling member has a first surface, on which at least one first lens is provided, a second surface, on which at least one second lens is provided, and a reflective surface. The photoelectric converter faces the first lens of the optical coupling member, and the optical fiber faces the second lens of the optical coupling member. The optical coupling device satisfies a condition of $0.3 < \beta < 0.9$; $\beta = NA1/NA2$, where NA1 is a numerical aperture of the photoelectric converter; NA2 is a numerical aperture of the optical fiber.

11 Claims, 5 Drawing Sheets

OPTICAL COUPLING DEVICE HAVING AT LEAST DUAL LENS AND A REFLECTIVE SURFACE

BACKGROUND OF THE INVENTION

1. Field of the Invention

The present invention relates generally to an optical device, and more particular to an optical coupling device.

2. Description of the Related Art

As the improvement of technology, more and more devices are designed for transmitting data through optical signals. Optical coupling device is one of the popular devices used in many fields.

U.S. Pat. No. 7,369,328 taught a conventional optical coupling device, in which an optical coupling member is provided between two optical connectors. The optical coupling member is respectively provided with a lens on opposite sides. A distance between the lens and a reflective surface is the same as the distance between the other lens and the reflective surface so that the optical coupling device may have a low signal loss and a high coupling efficiency in the optical coupling transmission when optical signals emit through the optical member and the lenses change the characters of the optical signals.

However, as the improvement of technology, the optical signals are designed to have various numerical apertures according to different requirements. When the optical signals with great numerical apertures emits through the conventional optical coupling device, the optical signals will be diffused to a margin of the lens that may increase the loss and distortion.

Therefore, the conventional optical coupling devices are designed for the optical signals with numerical apertures in a narrow range only. It will take a long time for alignment of the optical signals, and affect the locating accuracy of the optical coupling member. In conclusion, the conventional optical coupling device still needs to be improved.

SUMMARY OF THE INVENTION

The primary objective of the present invention is to provide an optical coupling device, which has a wide range of operation, fast optical signal alignment, high precision of optical positioning, and an allowable tolerance within ±10 μm.

According to the objective of the present invention, the present invention provides an optical coupling device, including an optical coupling member, at least one photoelectric converter, and at least one optical fiber. The optical coupling member has a first surface, on which at least one first lens is provided, a second surface, on which at least one second lens is provided, and a reflective surface. Optical signals enter the optical coupling member through the first lens, and then the optical signals are reflected by the reflective surface and leave the optical coupling member through the second lens; or optical signals enter the optical coupling member through the second lens, and then the optical signals is reflected by the reflective surface and leave the optical coupling member through the first lens. The photoelectric converter is in association with the first surface of the optical coupling member and faces the first lens. The photoelectric converter receives the optical signals from the optical coupling member and converts the optical signals into electrical signal, and then transmits the electrical signal out; or the photoelectric converter receives electrical signals from outside and converts the electrical signals into optical signal, and then transmits the optical signal to the optical coupling member. The optical fiber is in association with the second surface of the optical coupling member and faces the second lens. The optical fiber transmits optical signals to the optical coupling member, or receives the optical signals from the optical coupling member and transmits the optical signals out. The photoelectric converter and the optical fiber satisfy a condition of:

$$0.3<\beta<0.9;\ \beta=NA_1/NA_2$$

where $NA_1$ is a numerical aperture of the photoelectric converter; and $NA_2$ is a numerical aperture of the optical fiber.

In an embodiment, the first lens and the second lens satisfy a condition of:

$$0.5<\alpha<1.5;\ \alpha=R_1/R_2;$$

where $R_1$ is a radius of curvature of the first lens; and $R_2$ is a radius of curvature of the second lens.

In an embodiment, a distance between the first lens and the reflective surface is greater than a distance between the second lens and the reflective surface.

In an embodiment, the first lens has an aspheric surface.

In an embodiment, the second lens has an aspheric surface.

In an embodiment, the at least one photoelectric converter has a first photoelectric converter and a second photoelectric converter. The first photoelectric converter receives the electrical signals, converts the electrical signals into the optical signals and then transmits the optical signals to the optical coupling member. The second photoelectric converter receives the optical signals from the optical coupling member, converts the optical signals into the electrical signals and then outputs the electrical signals. The $NA_1$ is the numerical aperture of the first photoelectric converter.

In an embodiment, the first photoelectric converter is a vertical cavity surface emitting laser.

In an embodiment, the second photoelectric converter is a photodiode.

In an embodiment, the at least one optical fiber includes a first optical fiber and a second optical fiber. The first optical fiber receives the optical signals from the optical coupling member and outputs the optical signals. The second optical fiber receives the optical signals from outside and transmits the optical signals to the optical coupling member. The $NA_2$ is the numerical aperture of the second optical fiber.

In an embodiment, the at least one first lens includes a first inputting lens and a first outputting lens, and the at least one second lens includes a second inputting lens and a second outputting lens. The optical signals enter the optical coupling member through the first inputting lens and is reflected by the reflective surface, and then the optical signals leave the optical coupling member through the second outputting lens; or the optical signals enter the optical coupling member through the second inputting lens and is reflected by the reflective surface, and then the optical signals leave the optical coupling member through the first outputting lens.

In an embodiment, a preferable range of a is between 0.8 and 1.0

$$0.8<\alpha<1.0;\ \alpha=R_1/R_2;$$

Therefore, the optical coupling device may works for more photoelectric converter and optical fiber, and it also may reduce the time for aligning and increase the precision of optical positioning. Furthermore, the allowable shifting tolerance is about ±10 μm.

DETAILED DESCRIPTION OF THE INVENTION

The detailed description and technical contents of the present invention will be explained with reference to the accompanying drawings. However, the drawings are for illustration only and cannot be used to limit the present invention.

Figure 1:
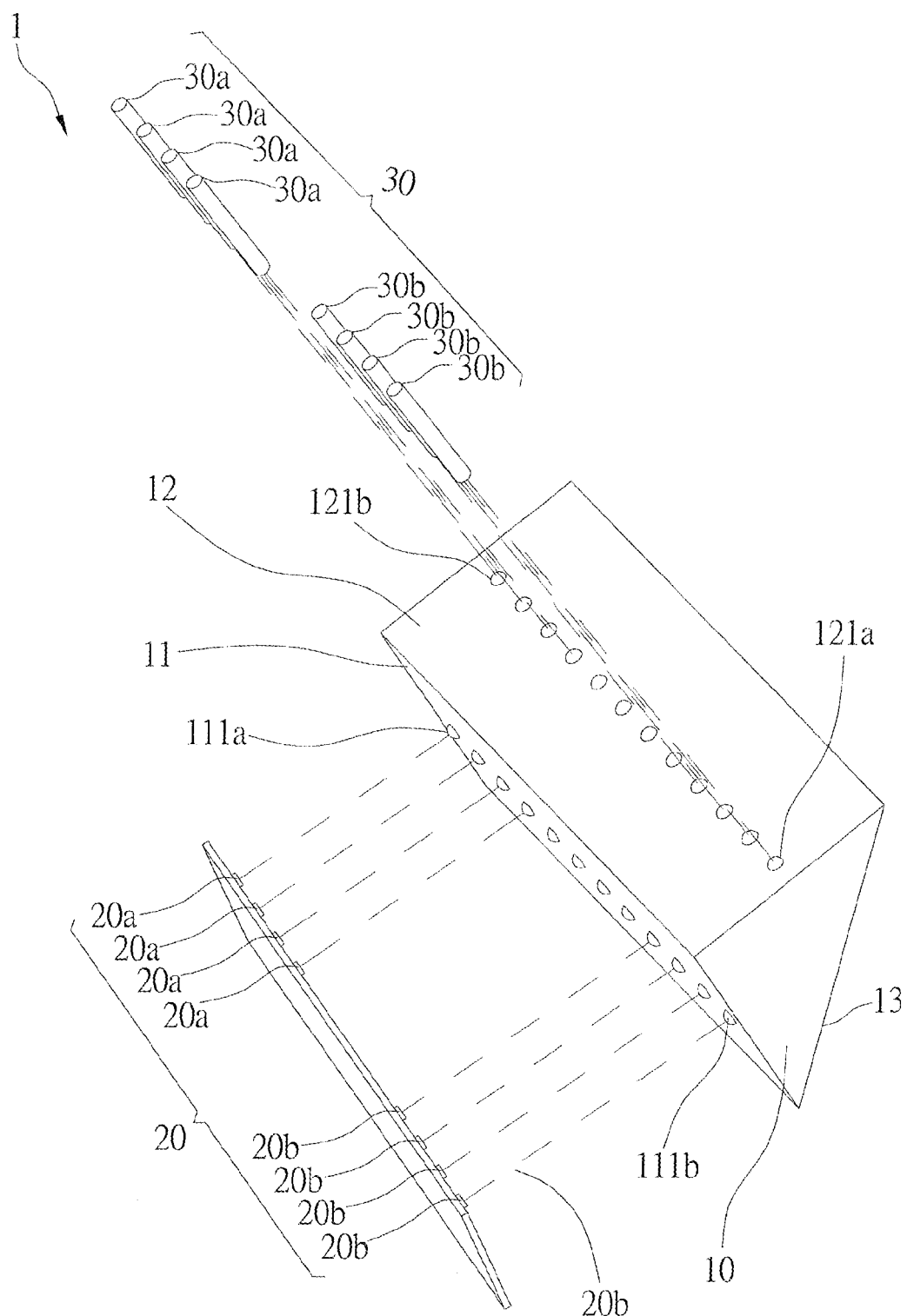
FIG. 1 is a perspective view of a preferred embodiment of the present invention.

As shown in FIG. 1, an optical coupling device of the preferred embodiment of the present invention is incorporated in a transceiver with four transmitting channels and four receiving channels and MT type ribbon optical fiber connector. The optical coupling device 1 includes an optical coupling member 10, a plurality of photoelectric converters 20, and a plurality of optical fibers 30.

Figure 2:
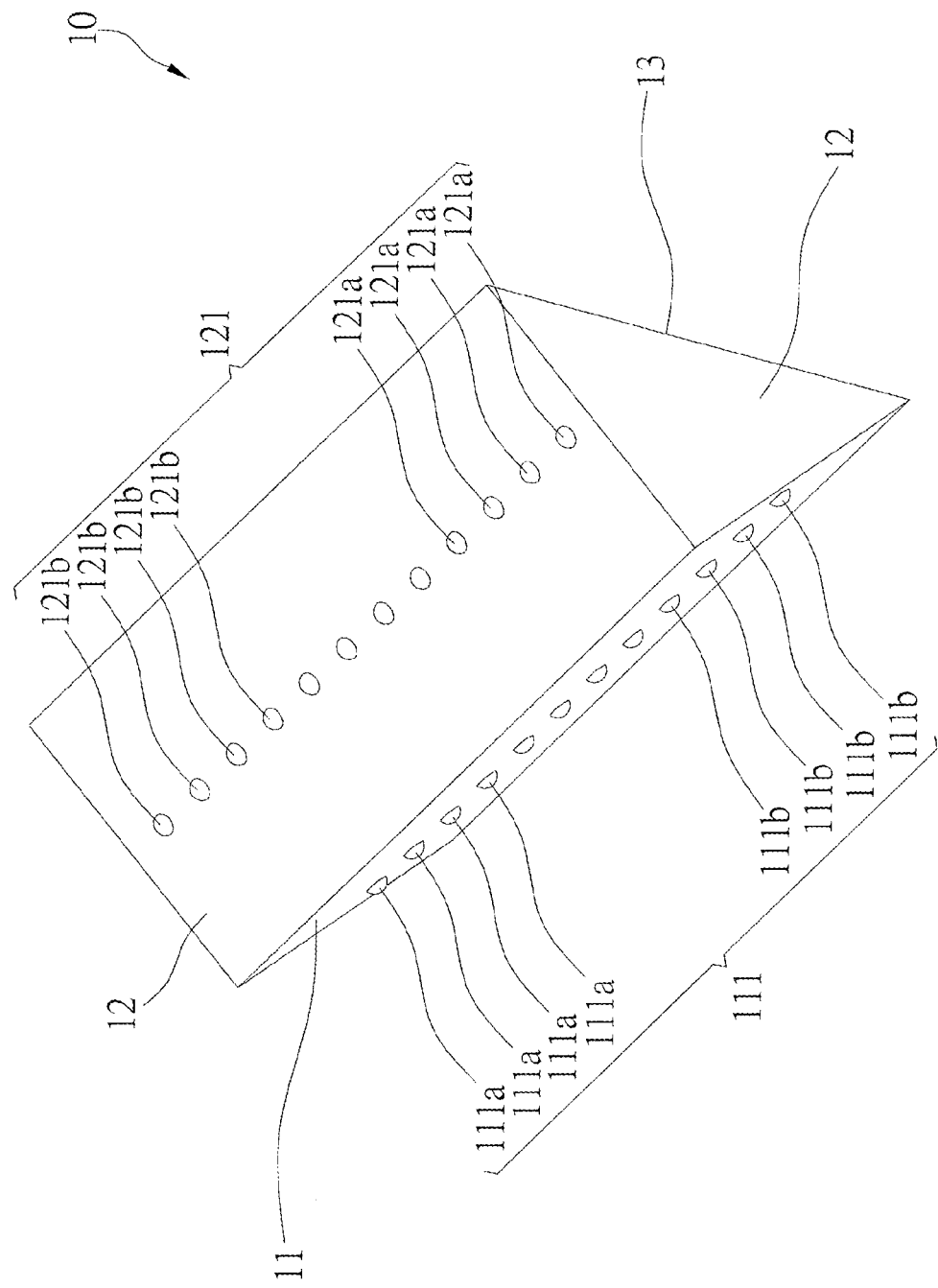
FIG. 2 is another perspective view of the preferred embodiment of the present invention.
Figure 3:
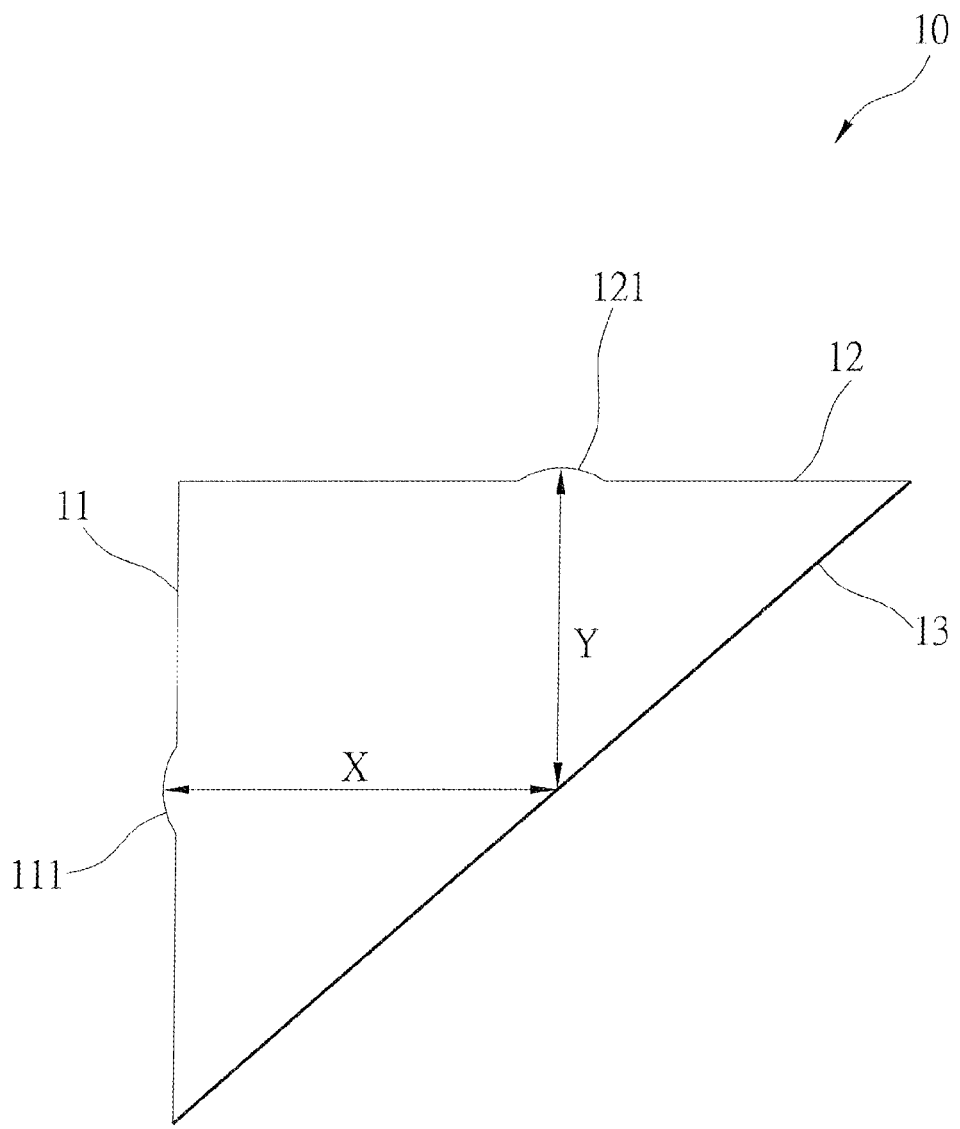
FIG. 3 is a sectional view of the preferred embodiment of the present invention.

As shown in FIG. 2, the optical coupling member 10 has a first surface 11, a second surface 12, and a reflective surface 13. In the present embodiment, twelve first lenses 111 are provided on the first surface 11 and arranged in a line, and twelve second lenses 121 are provided on the second surface 12 and arranged in a line. Each of the lenses 111 and 121 has an aspheric surface. As shown in FIG. 3, a distance X between each first lens 111 and the reflective surface 13 is greater than a distance Y between each second lens 121 and the reflective surface 13. This may extend some optical paths so that the optical coupling member 10 may have good optical performance through the long optical paths and the arrangement of the aspheric lenses 111 and 121. The first four lenses from a left of the line of the first lenses 111 are designated first inputting lenses 111a, and the first four lenses from a right are designated first outputting lenses 111b. The same as above, the first four lenses from a left of the line of the second lenses 121 are designated second inputting lenses 121a, and the first four lenses from a right are designated second outputting lenses 121b.

The photoelectric converters 20 face the first surface 11 of the optical coupling member 10 so that the photoelectric converters 20 are respectively aligned with the corresponding first lenses 111. The photoelectric converters 20 have four first photoelectric converters 20a which are respectively in association with the first inputting lenses 111a and four second photoelectric converters 20b which are respectively in association with the first outputting lenses 111b. The first photoelectric converters 20a receive electrical signals and convert the electrical signals into optical signals, and then transmit the optical signals to the optical coupling member 10. The second photoelectric converters 20b receive optical signals from the optical coupling member 10 and convert the optical signals into electrical signals, and then output the electrical signals. In the present embodiment, the first photoelectric converters 20a are vertical cavity surface emitting lasers (VCSEL), and the second photoelectric converters 20b are photodiodes (PD). The photoelectric converters 20a and 20b may use any equivalent device which may achieve the same function.

The optical fibers 30 face the second surface 12 of the optical coupling member 10. One end of the optical fibers 30 are respectively aligned with the second lenses 121. The optical fibers 30 have four first optical fibers 30a and four second optical fibers 30b. The first optical fibers 30a receive optical signals from the optical coupling member 10 and output them, and the second optical fibers 30b receive optical signals from outside and transmit them to the optical coupling member 10.

Figure 4:
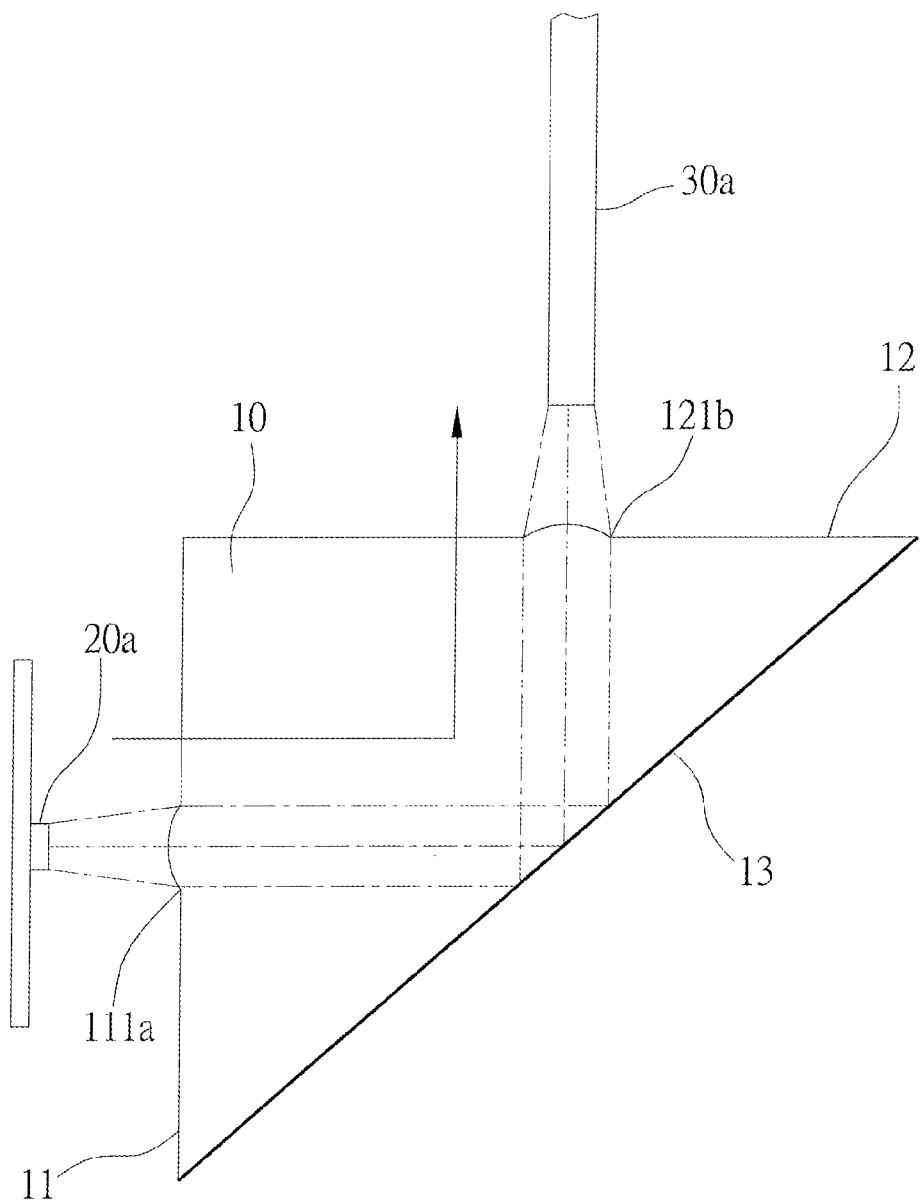
FIG. 4 shows the transmitting path of the optical signals from the photoelectric converter to the optical fiber.
Figure 5:
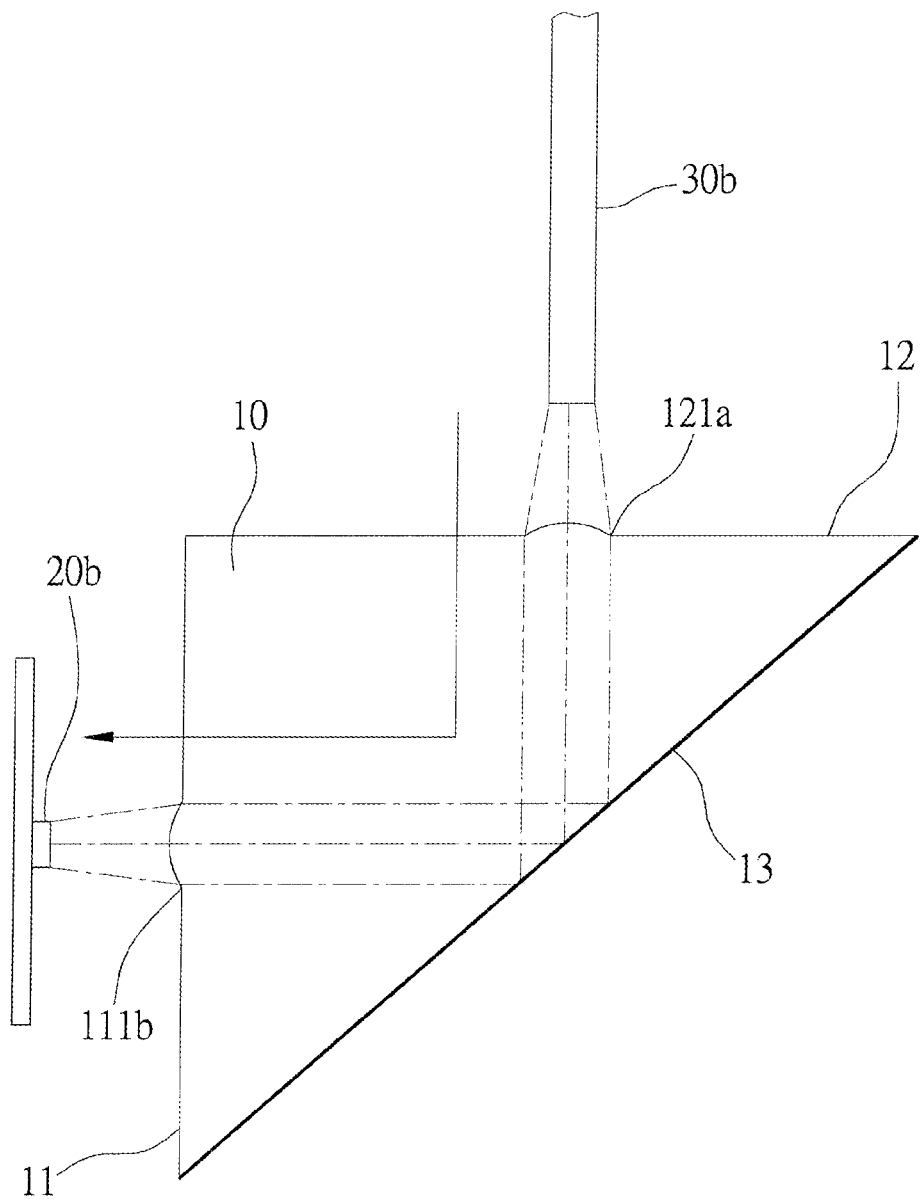
FIG. 5 shows the transmitting path of the optical signal from the optical fiber to the photoelectric converter.

As shown in FIG. 4, after the first photoelectric converters 20a receive electrical signals, they will convert the electrical signals into optical signals and then transmit the optical signals to the optical coupling member 10. The optical signals enter the optical coupling member 10 through the first inputting lenses 111a on the first surface 11, and then are reflected by the reflective surface 13. Finally, the optical signals leave the optical coupling member 10 through the second outputting lenses 121b on the second surface 12 and emit toward the first optical fibers 30a. On the contrary, as shown in FIG. 5, optical signals of the second optical fibers 30b enter the optical coupling member 10 through the second inputting lenses 121a on the second surface 12 and are reflected by the reflective surface 13. The optical signals emit toward the second photoelectric converters 20b through the first outputting lenses 111b on the first surface 11, and then the second photoelectric converters 20b convert the optical signals into electrical signals.

In order to obtain a low loss and high optical coupling transmission, the first lenses 111 and the second lenses 121 should satisfy the following condition:

$$0.5 < \alpha < 1.5; \alpha = R_1/R_2;$$

where $R_1$ is a radius of curvature of each first lens 111; and $R_2$ is a radius of curvature of each second lens 121.

It is more preferable that the range is narrowed to $0.8 < \alpha < 1.0$ to obtain a better result.

In conclusion, the coupling device of the present invention may have many characters, including low diffusion, low loss, and high optical coupling. The coupling device of the present invention may work with the photoelectric converters and the optical fibers with the following condition:

$$0.3 < \beta < 0.9; \beta = NA_1/NA_2$$

where $NA_1$ is a numerical aperture of the first photoelectric converter 20a; and $NA_2$ is a numerical aperture of the second optical fiber 30b.

The present invention provides the optical coupling device with specified optical paths (the distance X is longer than the distance Y) and the aspheric lenses 111 and 121 with specified radius of curvature that may make the optical coupling device to work with more the photoelectric converters 20 and the optical fibers 30 (the numerical apertures of the photoelectric converters 20 and the optical fibers 30 are in a wide range). Besides, it also may reduce the time for alignment and increase the precision of optical positioning. Furthermore, the allowable shifting tolerance is about ±10 μm.

The description above is a few preferred embodiments of the present invention. For example, the lenses 111, 121 for inputting and outputting signals may be provided on the same optical coupling member 10, or they can be provided on different members (one member for outputting signal only, and the other for inputting signal only). The equivalence of the present invention is still in the scope of claim construction of the present invention.

What is claimed is:

1. An optical coupling device, comprising:
   an optical coupling member having a first surface, on which at least one first lens is provided, a second surface, on which at least one second lens is provided, and a reflective surface, wherein optical signals enter the optical coupling member through the first lens, and then the optical signals is reflected by the reflective surface to leave the optical coupling member through the second lens; or optical signals enter the optical coupling member through the second lens, and then the optical signals is reflected by the reflective surface to leave the optical coupling member through the first lens;

at least one photoelectric converter in association with the first surface of the optical coupling member and facing the first lens, wherein the photoelectric converter receives the optical signals from the optical coupling member and converts the optical signals into electrical signals, and then transmits the electrical signals out; or the photoelectric converter receives electrical signals and converts the electrical signals into optical signals, and then transmits the optical signals to the optical coupling member; and at least one optical fiber in association with the second surface of the optical coupling member and facing the second lens, wherein the optical fiber transmits optical signals to the optical coupling member, or receives the optical signals from the optical coupling member and transmits the optical signals out;

wherein the photoelectric converter and the optical fiber satisfy a condition of:

$$0.3 < \beta < 0.9; \beta = NA_1/NA_2$$

where $NA_1$ is a numerical aperture of the photoelectric converter; and $NA_2$ is a numerical aperture of the optical fiber.

2. The optical coupling device as defined in claim 1, wherein the first lens and the second lens satisfy a condition of:

$$0.5 < \alpha < 1.5; \alpha = R_1/R_2;$$

where $R_1$ is a radius of curvature of the first lens; and $R_2$ is a radius of curvature of the second lens.

3. The optical coupling device as defined in claim 1, wherein a distance between the first lens and the reflective surface is greater than a distance between the second lens and the reflective surface.

4. The optical coupling device as defined in claim 1, wherein the first lens has an aspheric surface.

5. The optical coupling device as defined in claim 1, wherein the second lens has an aspheric surface.

6. The optical coupling device as defined in claim 1, wherein the at least one photoelectric converter has a first photoelectric converter and a second photoelectric converter; the first photoelectric converter receives the electrical signals, converts the electrical signals into the optical signals and then transmits the optical signals to the optical coupling member; and the second photoelectric converter receives the optical signals from the optical coupling member, converts the optical signals into the electrical signals and then outputs the electrical signals, wherein the $NA_1$ is the numerical aperture of the first photoelectric converter.

7. The optical coupling device as defined in claim 6, wherein the first photoelectric converter is a vertical cavity surface emitting laser.

8. The optical coupling device as defined in claim 6, wherein the second photoelectric converter is a photodiode.

9. The optical coupling device as defined in claim 1, wherein the at least one optical fiber includes a first optical fiber and a second optical fiber; the first optical fiber receives the optical signals from the optical coupling member and outputs the optical signals; and the second optical fiber receives the optical signals from outside and transmits the optical signals to the optical coupling member, wherein the NA2 is the numerical aperture of the second optical fiber.

10. The optical coupling device as defined in claim 1, wherein the at least one first lens includes a first inputting lens and a first outputting lens, and the at least one second lens includes a second inputting lens and a second outputting lens; the optical signals enter the optical coupling member through the first inputting lens and is reflected by the reflective surface, and then the optical signals leave the optical coupling member through the second outputting lens; and the optical signals enter the optical coupling member through the second inputting lens and is reflected by the reflective surface, and then the optical signals leave the optical coupling member through the first outputting lens.

11. The optical coupling device as defined in claim 2, wherein the first lens and the second lens satisfy a condition of:

$$0.8 < \alpha < 1.0; \alpha = R_1/R_2;$$

where $R_1$ is a radius of curvature of the first lens; and $R_2$ is a radius of curvature of the second lens.

* * * * *